United States Patent Office 3,518,597
Patented June 30, 1970

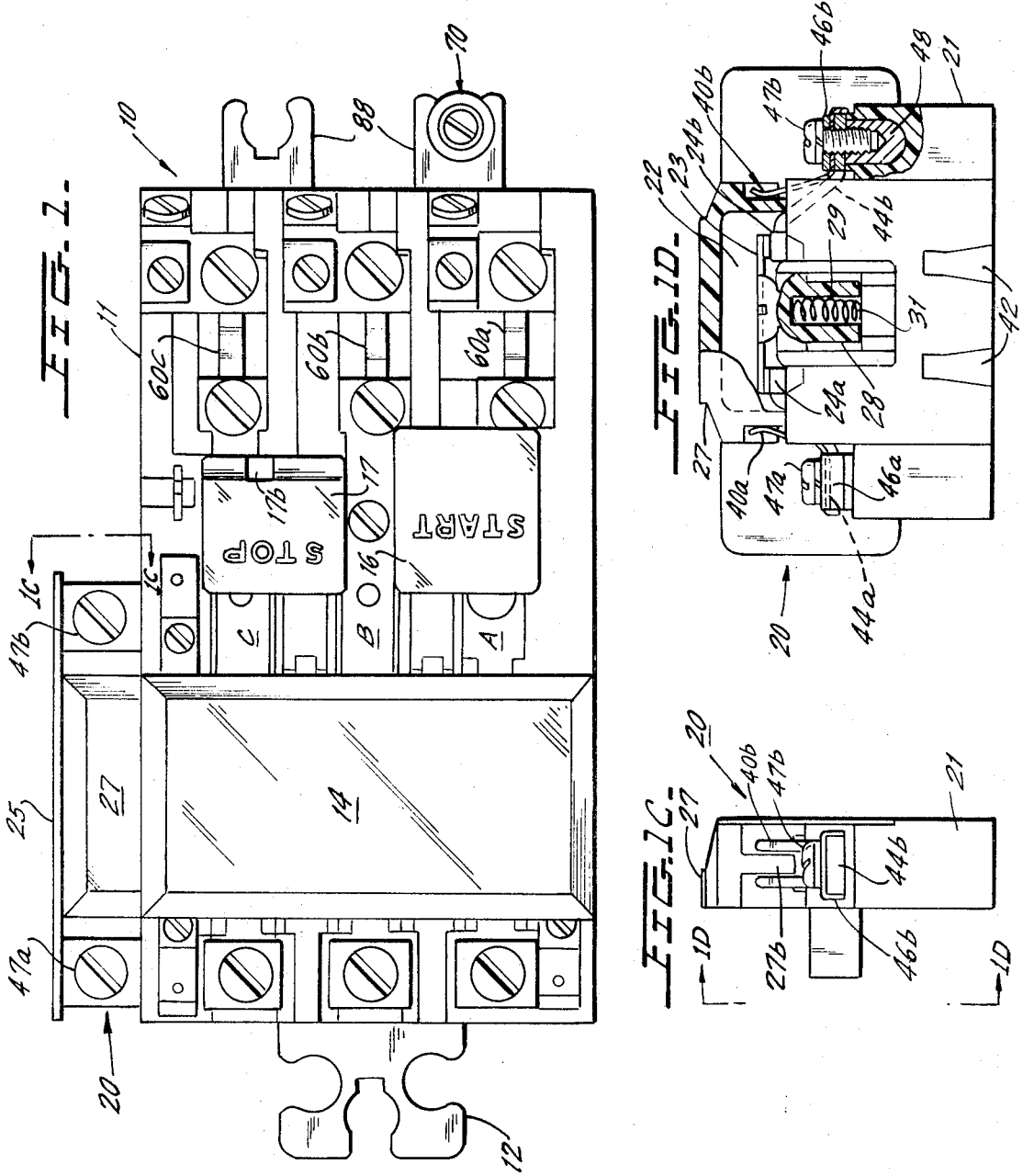

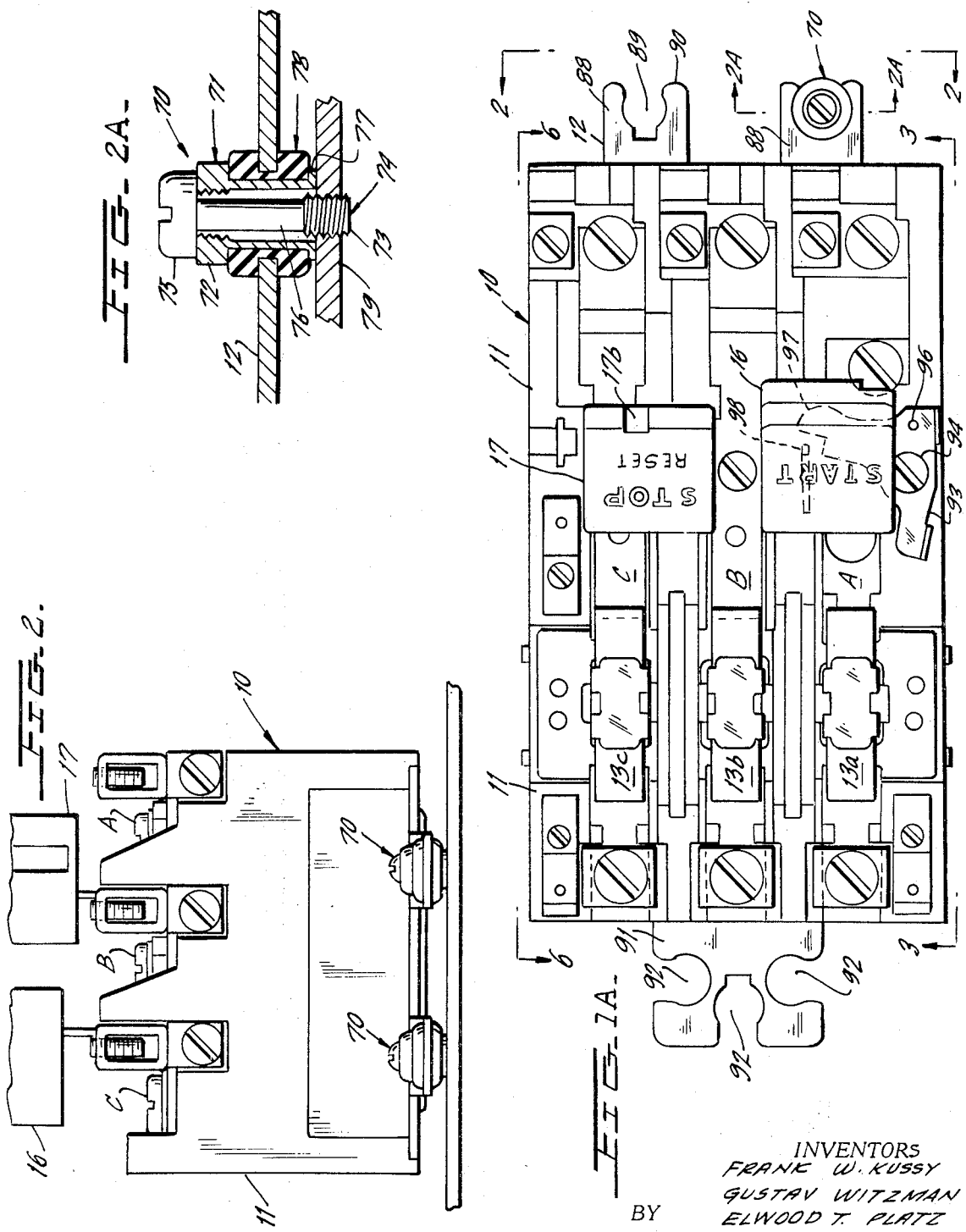

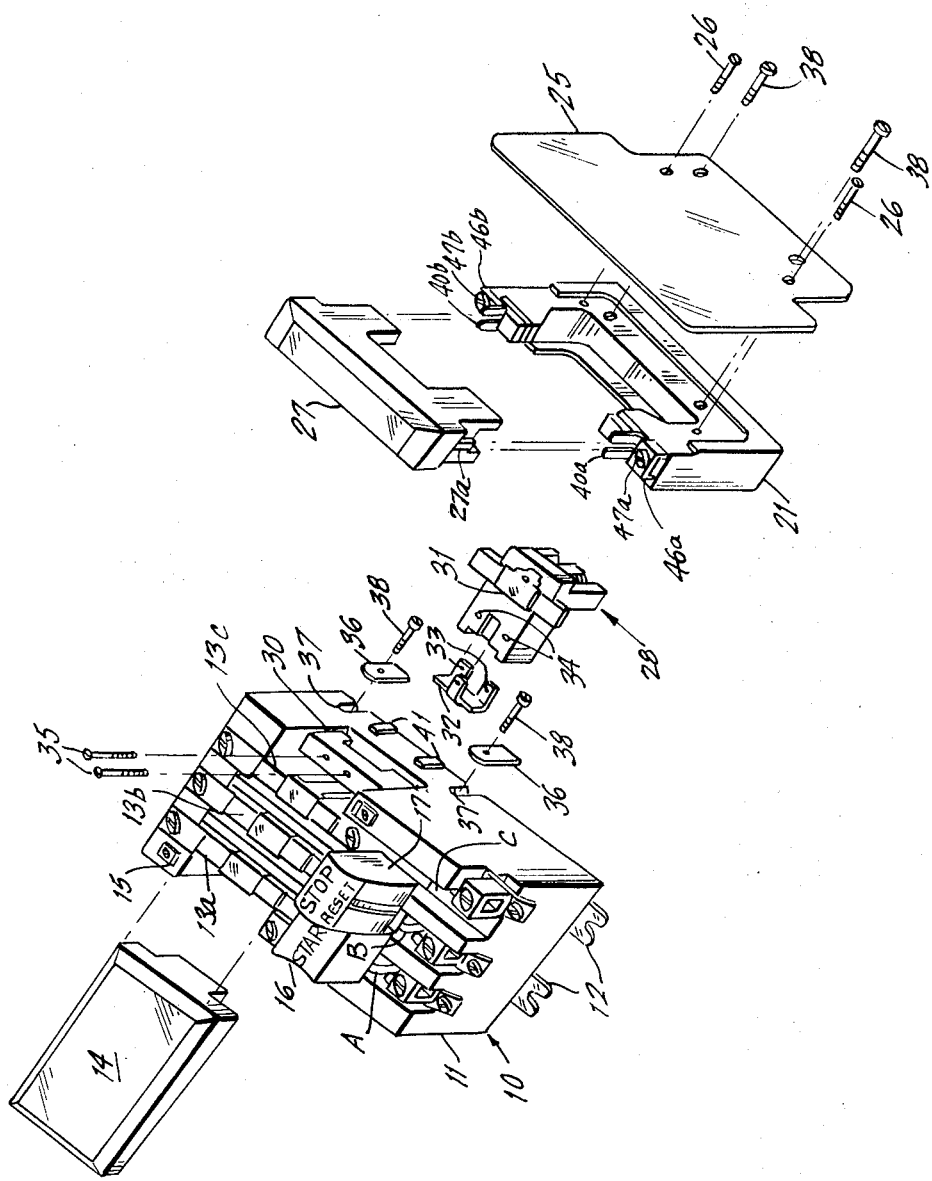

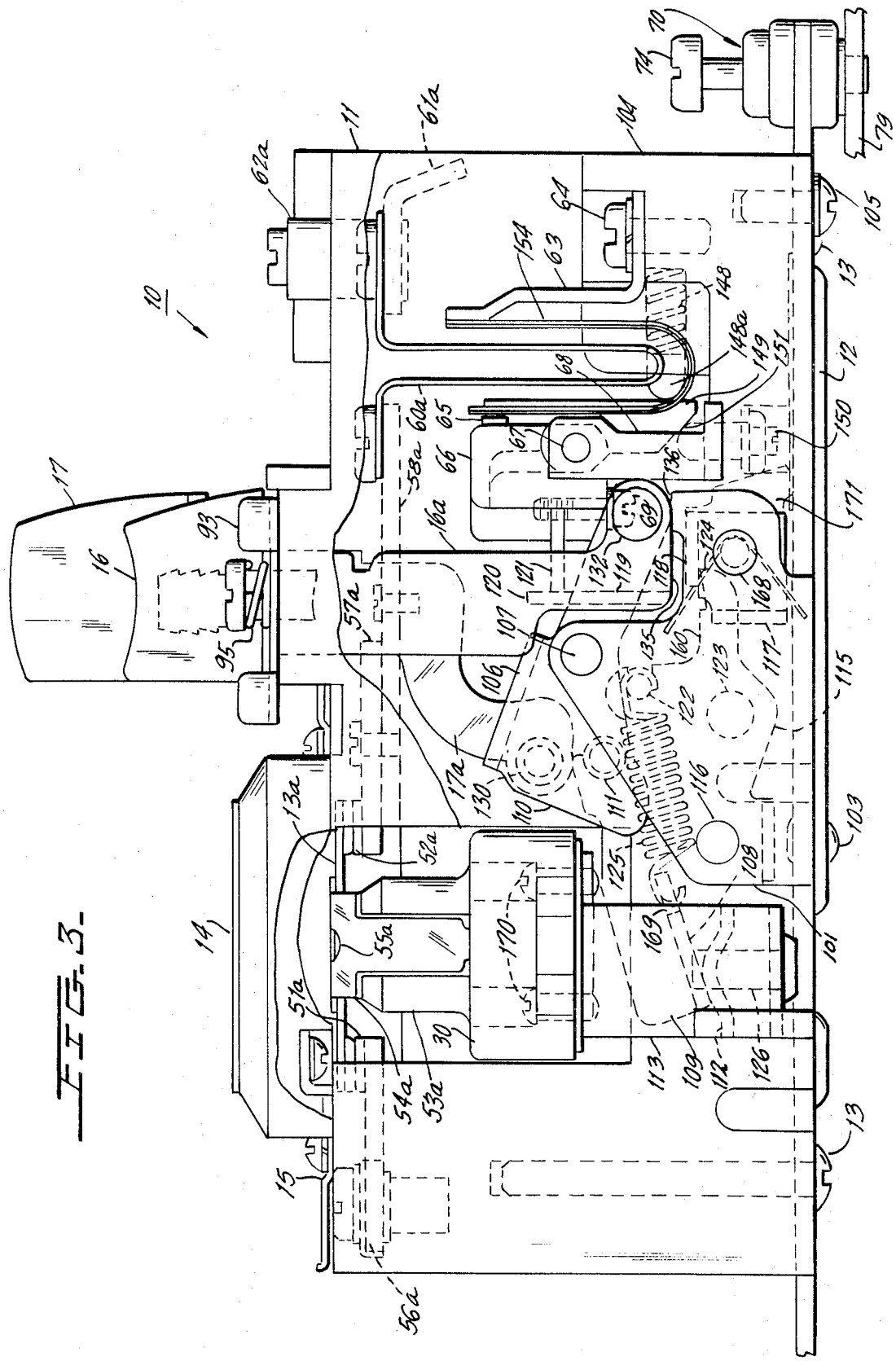

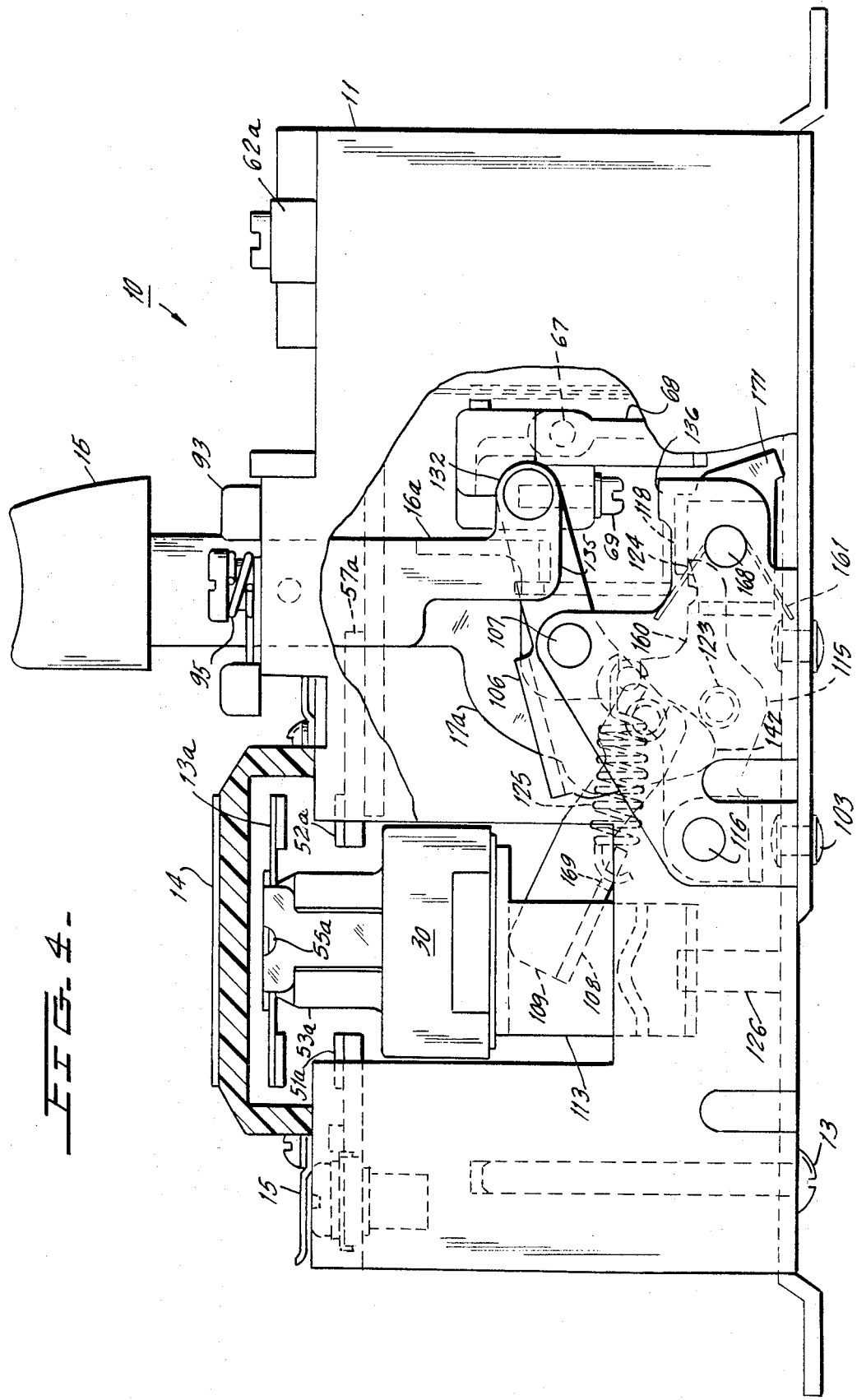

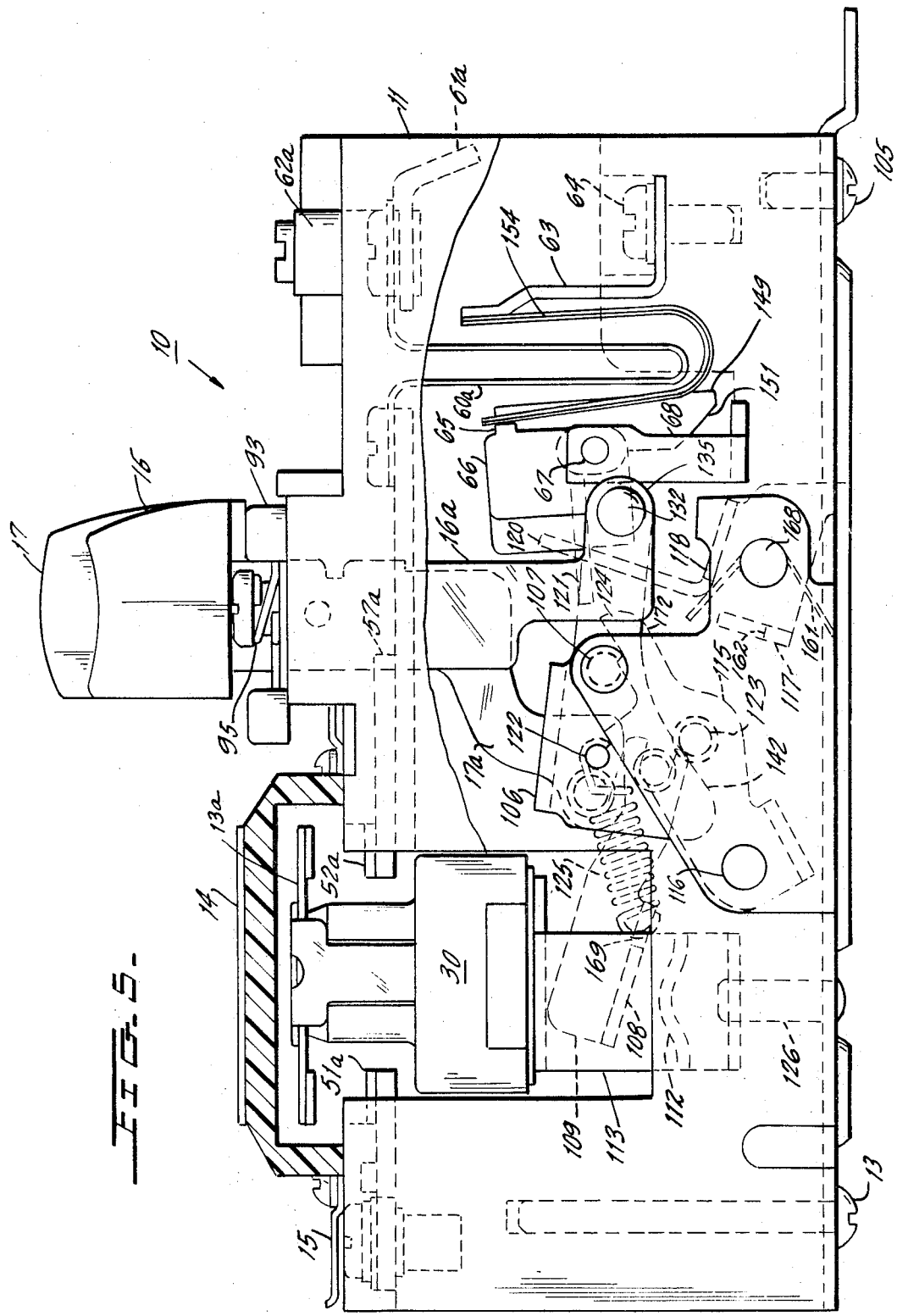

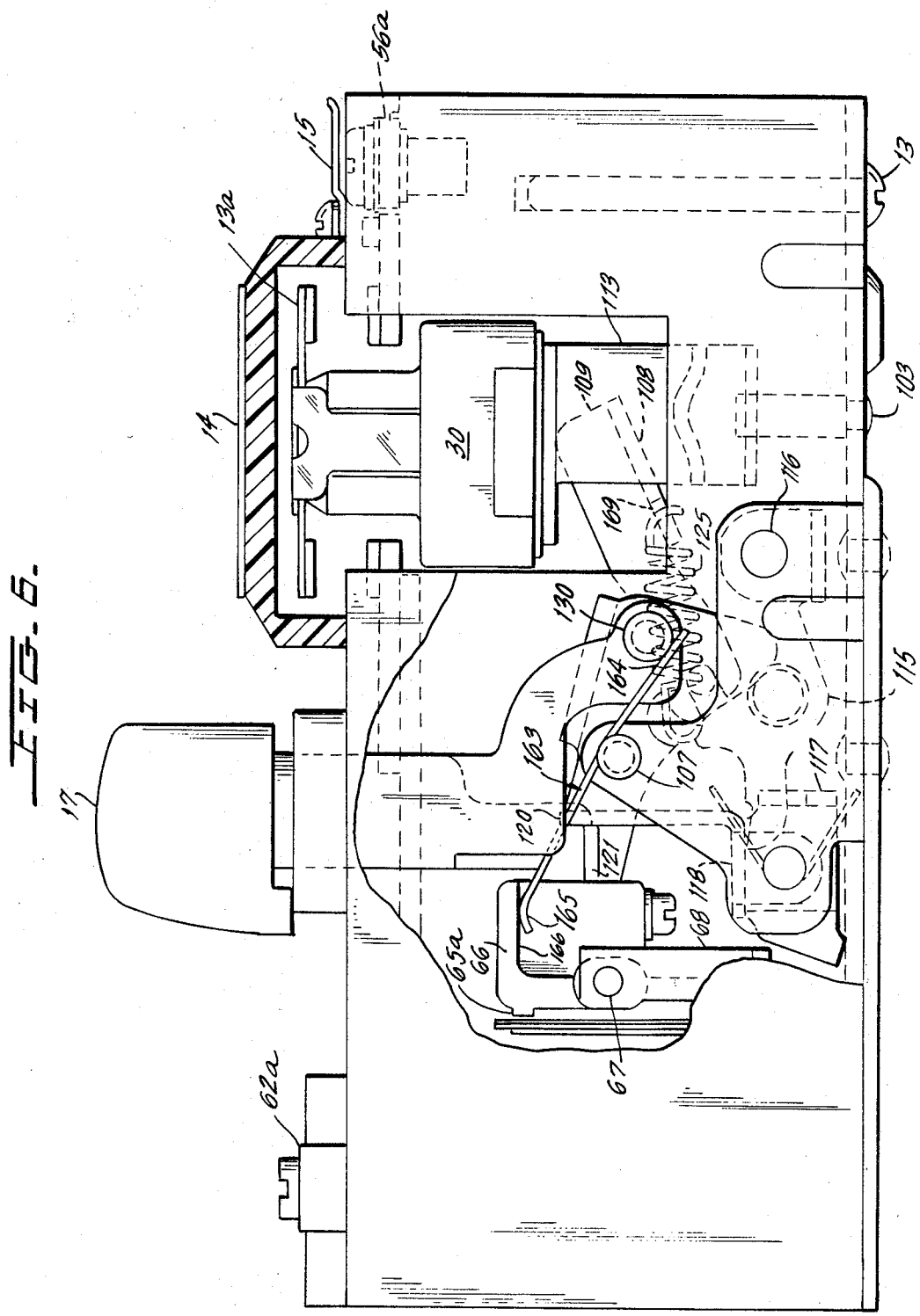

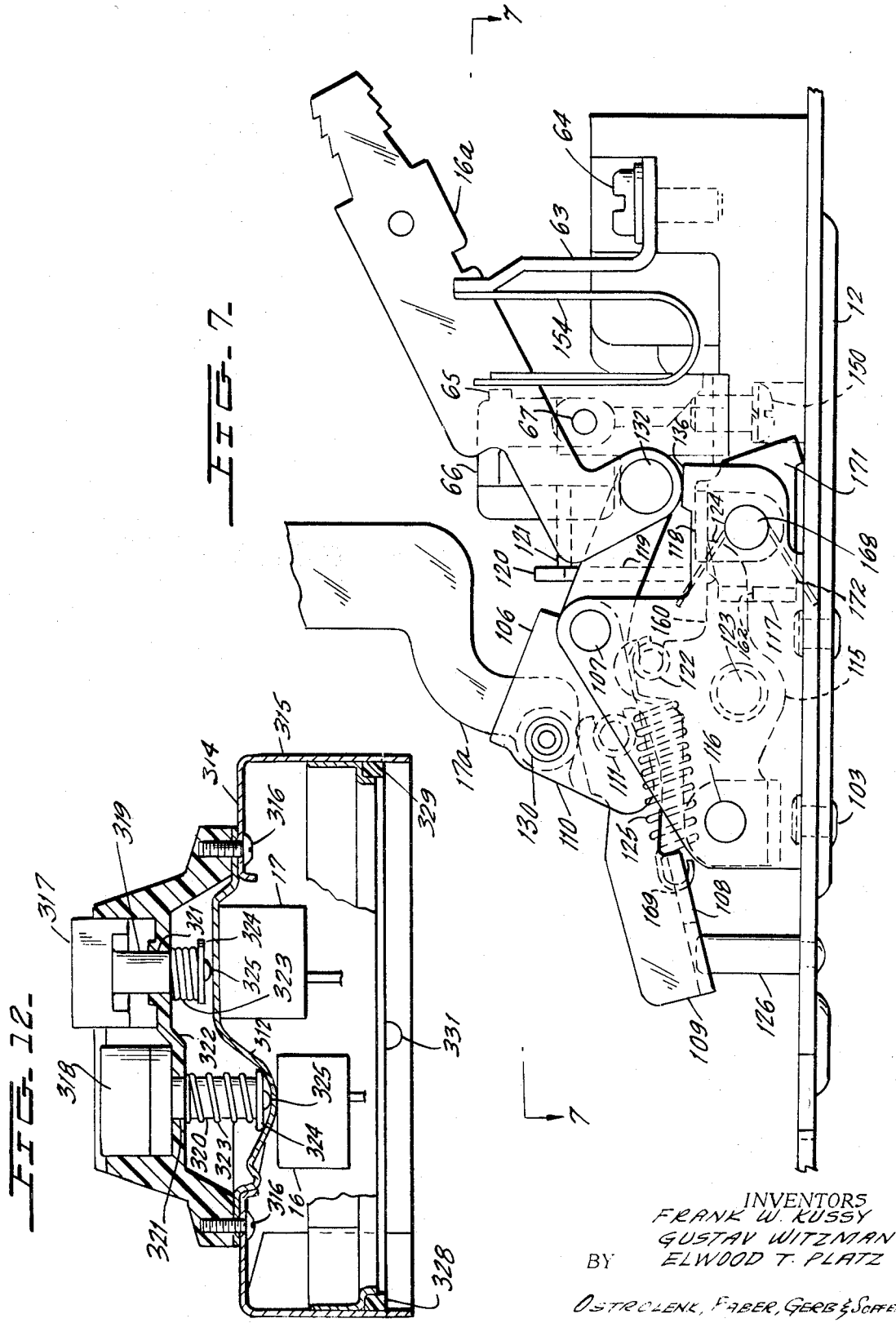

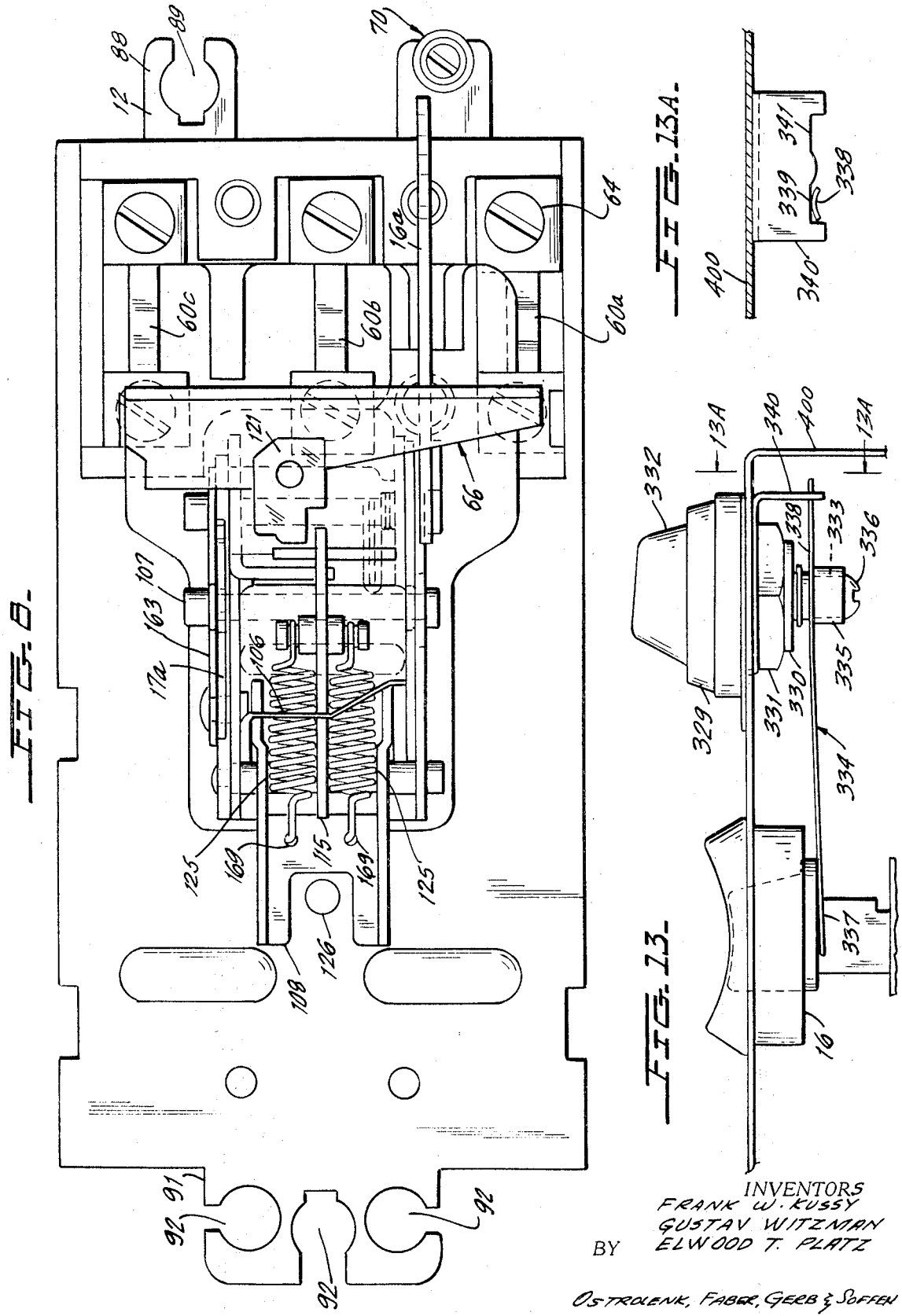

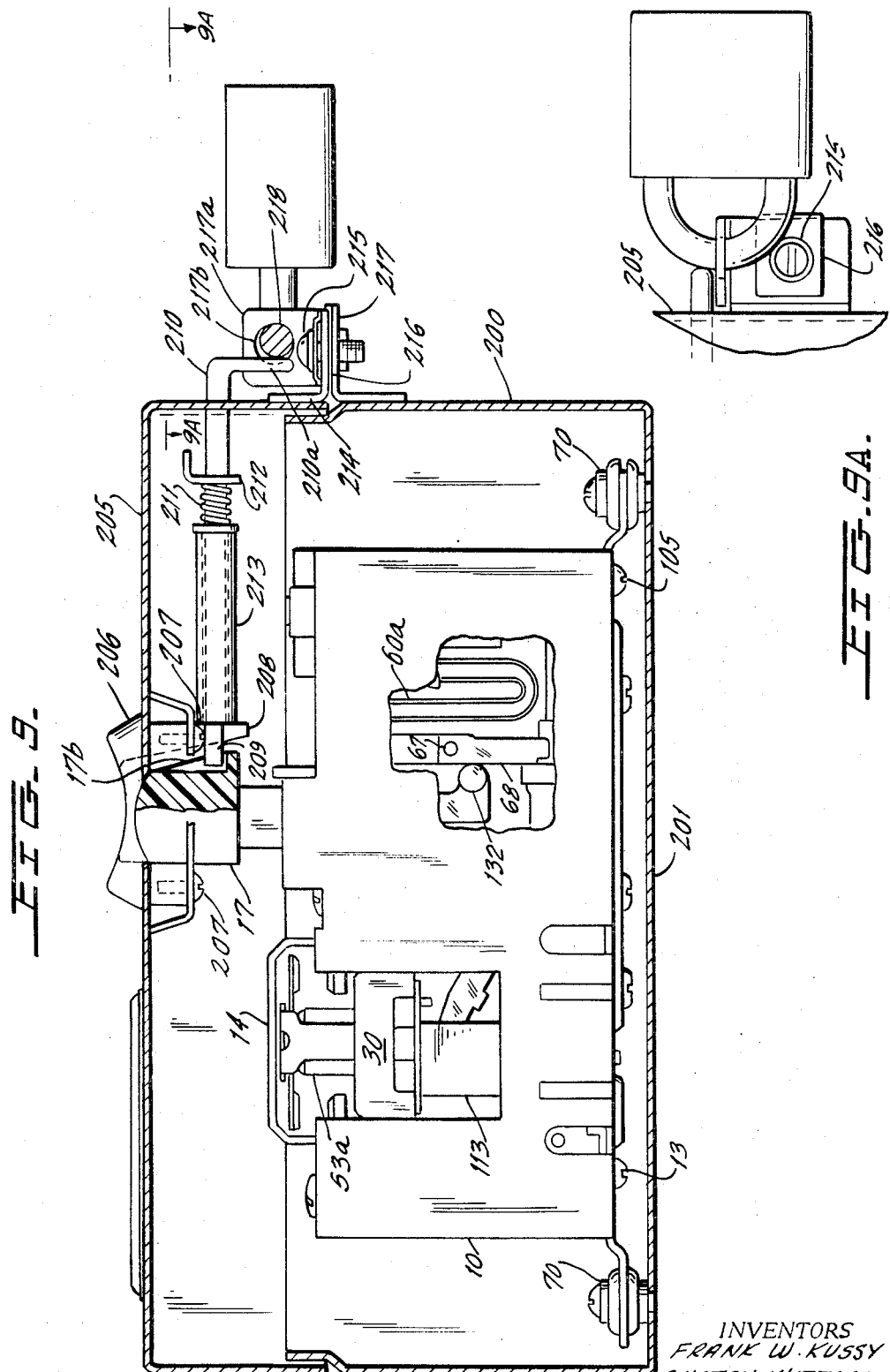

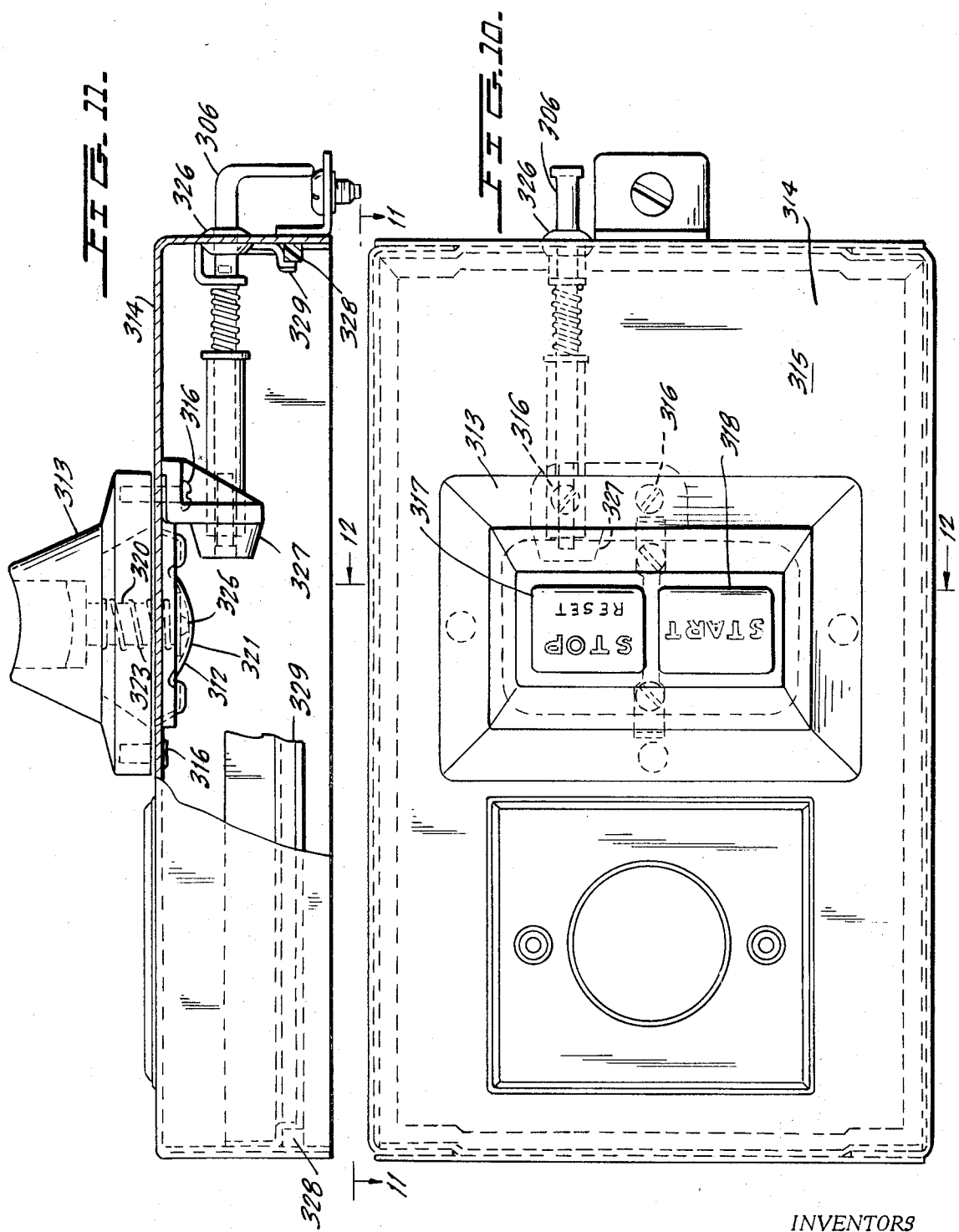

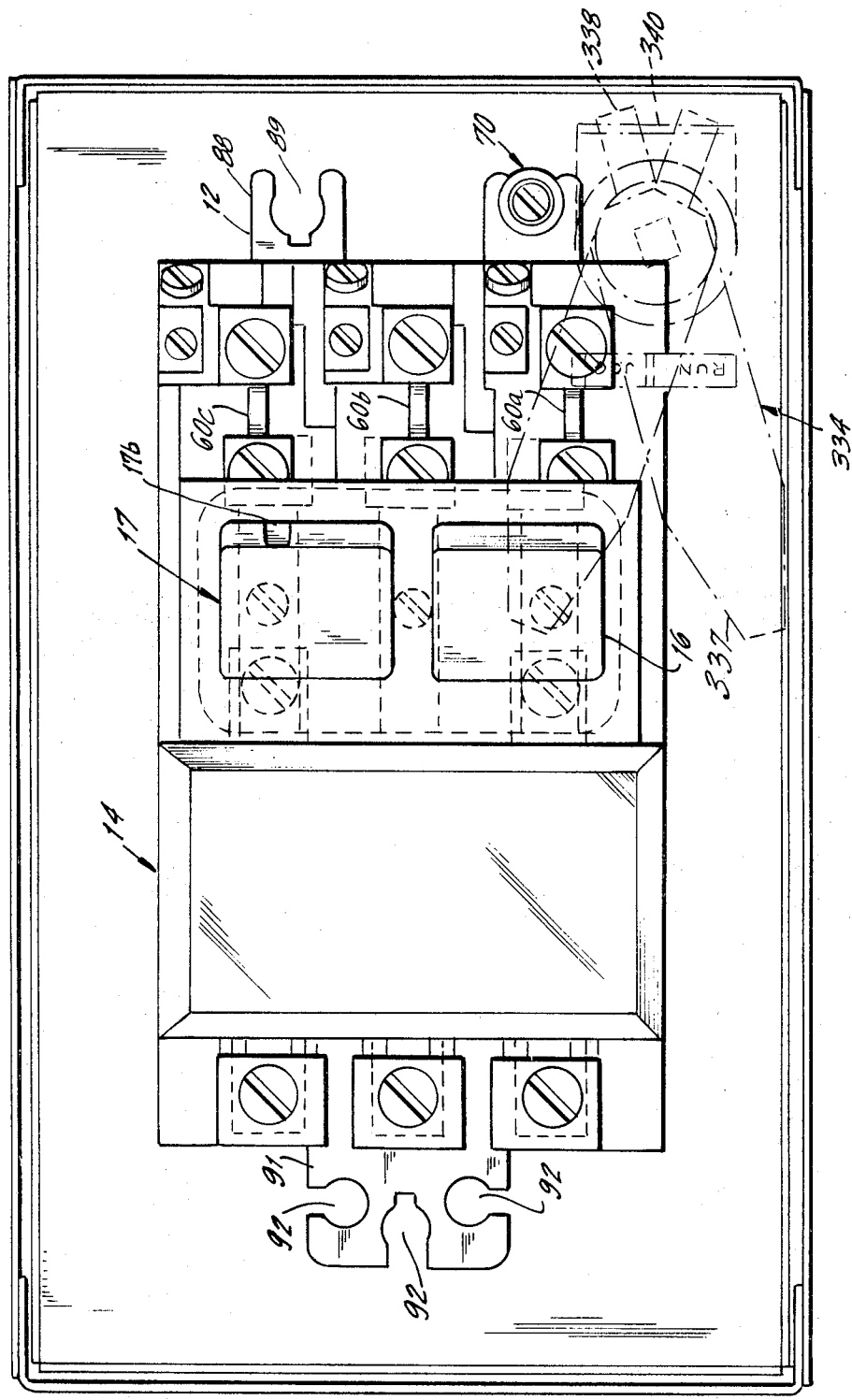

3,518,597
MANUAL MOTOR STARTER
Elwood T. Platz, Grosse Pointe Farms, Frank W. Kussy, Birmingham, and Gustav Witzmann, Detroit, Mich., assignors, by mesne assignments, to I-T-E Imperial Corporation, Philadelphia, Pa., a corporation of Delaware
Filed Apr. 29, 1968, Ser. No. 725,004
Int. Cl. H01h 3/12, 9/04, 71/16
U.S. Cl. 337—46  7 Claims

ABSTRACT OF THE DISCLOSURE

A push-button operated three-phase motor starter is provided with means for increasing the latch biasing force in the off position of the starter to prevent unwanted unlatching when the starter is subject to mechanical shock. An add-on fourth pole unit is provided for the starter constructed with cover holding spring clips of conducting material held in position by the terminal clamping screws of the add-on unit. A shock mounting means for securing the starter within an enclosure is constructed with its elements captive on the screw which mates with a threaded aperture in a wall of the enclosure. A pivoted jogging selector mounted to the enclosure cover selectively operates a cantilever spring into and out of an operative position with respect to the start control of the starter.

The enclosure cover is dust-tight and is provided with push buttons in alignment with the starter push buttons with a cover mounted diaphragm formed to lightly bias the cover mounted push buttons toward the starter push buttons to provide a positive indication of the positions of the starter push buttons. A locking rod slidably mounted to the enclosure cover is operable to a blocking position with respect to the stop button and is held in this position by a lock to prevent unauthorized operation of the starter.

---

This invention relates to manually operated circuit interrupters in general and more particularly to multi-phase interrupters specifically adapted for motor starter service.

Three-phase manual motor starters are provided with thermal tripping means individual to each phase and a common operating mechanism to simultaneously operate all three phases to circuit open and circuit closed positions. Service in environments where the starter is subject to mechanical shock often results in unwanted unlatching of the operating mechanism when the starter is open since the latch load is reduced in the stop position over what it would in the start position.

In the starter of the instant invention accidental unlatching is prevented by increasing the biasing force, urging the latch to latching position, as the starter is operated from start to stop positions thereof. The overall effects of mechanical shock on the starter is lessened by providing shock mountings, each of which is provided with a fastening screw constructed in a manner to capture a spacing tube and resilient cushioning element.

A pivoting cantilever mounted leaf spring is mounted to an openable cover for the enclosure wherein the starter is mounted. The leaf spring is selectively operable into blocking position with respect to the start control to bias the latter outward. Under this condition whenever the start control is released the spring automatically stops the starter.

The enclosure cover is provided with a sealing gasket as part of a dust-tight construction in which cover carried push buttons are mounted to a diaphragm which is so constructed that self-biasing forces of the diaphragm lightly bias the cover mounted push buttons into engagement with the starter push buttons. This provides a positive indication external of the enclosure showing the position of the starter control buttons.

To lock the starter in start position against unauthorized operation to the stop position a cover mounted rod is provided. Such rod is axially movable into a recess in the stop control so shaped that the start control cannot be depressed when the rod is in the recess. A key operated lock mountable to the cover locks the cover closed and maintains the rod in position to block to prevent withdrawal of the stop control.

An add-on fourth pole provided for the three-phase starter includes spring-clip means for removable securement of the contact corner. The spring clip is constructed of electrically conductive material and is maintained in an operative position by the same screw which mounts the terminal means for the add-on pole unit and also provides wire gripping forces.

Accordingly, a primary object of this invention is to provide a novel construction for a multi-phase manual motor starter.

Another object is to provide a novel means to minimize the adverse effect of mechanical shock on a circuit interrupting device.

Still another object is to provide a novel construction of a cover clip-terminal combination for a circuit-interrupting device.

A further object is to provide a novel means for mounting push button controls to the openable cover of a dust-tight enclosure.

A still further object is to provide novel enclosure mounted means for preventing unauthorized manual opening of a motor starter mounted within the enclosure.

These objects, as well as other objects of this invention will become apparent after reading the following description of the accompanying drawings in which:

FIG. 1 is a plan view of a manual starter constructed in accordance with teachings of the instant invention and having an add-on fourth pole mounted thereto.

FIG. 1A is a plan view of the starter of FIG. 1 with the cover for the main contacts removed.

FIG. 1B is an exploded perspective of selected elements shown in FIG. 1.

FIG. 1C is a side elevation of the add-on fourth pole of FIG. 1, with the contact cover removed, looking in the direction of arrows 1C—1C of FIG. 1.

FIG. 1D is a fragmentary cross-section taken through line 1D—1D of FIG. 1C looking in the direction of arrows 1D, 1D.

FIG. 2 is an end view of the manual starter looking in the direction of arrows 2—2 of FIG. 1A.

FIG. 2A is an enlarged cross-section of a shock mounting means taken through line 2A—2A of FIG. 1A looking in the direction of arrows 2A, 2A.

FIGS. 3, 4 and 5 are side elevations of the starter looking in the direction of arrows 3, 3 of FIG. 1A with substantial portions of the housing broken away to reveal the contact operating mechanism. In FIG. 3 the main contacts of the starter are closed; in FIG. 4 these contacts have been manually operated to open position, and in FIG. 5 these contacts are also in open position having been operated thereto through the tripping of the operating mechanism.

FIG. 6 is a side elevation of the starter looking in the direction of arrows 6, 6 of FIG. 1A with the contacts in open circuit position.

FIG. 7 is a side elevation of the starter with the housing and all elements mounted thereto removed and the movable contacts and their carrier also removed.

FIG. 8 is a plan view of the elements of FIG. 7 looking in the direction of arrows 7, 7 of FIG. 7.

FIG. 9 is a side elevation showing the starter mounted within an enclosure having an openable cover and means for locking the cover closed. In FIG. 9 the near side of the housing is removed to better reveal shapes of elements within the housing.

FIG. 9A is a fragmentary plan view of FIG. 9 looking in the direction of arrows 9A, 9A.

FIG. 10 is a plan view of a dust type cover to replace the housing cover shown in FIG. 9.

FIG. 11 is a side elevation of the cover shown in FIG. 10 looking in the direction of arrows 11, 11 of FIG. 10.

FIG. 12 is a cross-section taken through line 12—12 of FIG. 10 looking in the direction of arrows 12, 12.

FIG. 13 is a side elevation showing a simplified means for adding a selective jogging feature to the starter enclosure of FIG. 9.

FIG. 13A is an end view of a detent means looking in the direction of arrows 13A, 13A of FIG. 13.

FIG. 14 is a plan view of the jogging feature elements of FIG. 13.

Now referring to the figures.

As seen in FIG. 1, 1A and 1B, starter 10 is a three pole unit providing individual current paths A, B, C for three circuits. Starter 10 includes molded insulating case 11 secured to metal mounting plate 12 by screws 13 (FIG. 3). Readily removable movable bridging contacts 13a, 13b and 13c are provided for each pole of starter 10. Contact cover 14 is provided with downward projections (not shown) which extend into and are held by spring retainers 15, 15 in recesses of base 11 to hold cover 14 in closed position over movable contacts 13a, 13b, 13c. As will hereinafter be seen, depressible start and stop control buttons 16, 17 positioned forward of case 11 and provided to operate bridging contacts 13a, 13b, 13c into and out of engagement with pairs of spaced stationary contacts. In FIG. 1 add-on fourth pole unit 20 is shown mounted to starter 10.

As best seen in FIGS. 1, 1B, 1C and 1D, add-on unit 20 includes insulating base 21 formed with recess 22 which provides clearance for movement of bridging contact 23 into and out of engagement with spaced stationary contacts 24a, 24b. Insulating sheet 25 held in place by screws 26, 26, closes one side of base 21 and removable contact cover 27 closes the top of base 21. Bridging contact 23 is mounted to insulating carrier 28 and is biased downward by coil spring 29 acting on inverted U-shaped retainer 31. Metal clip 32 snapped onto a lateral extension of carrier 28 is provided with threated apertures 33, 33 in alignment with and below clearance apertures 34, 34 of carrier 28. Screws 35, 35 pass through movable contact carrier 30 of starter 10 and clearance apertures 34, 34 and are threadably received by aperture 33, 33 to fixably secure add-on unit contact carrier 28, carrier 30 so that the two carriers 28, 30 move in unison.

Mounting nuts 36, 36 are friction mounted within appropriate recesses of starter case 11 and are positioned so that threaded apertures of nuts 36, 36 are accessible at case cut-outs 37, 37. Screws 38, 38 pass through clearance aperture in cover sheet 25 and base 21 and are threadably received by mounting nuts 36, 36 to machanically secure add-on unit 20 to starter 10. Embossments 41, 41 at the side of starter case 11 cooperates with recesses 42, 42 of base 21 to aid in the relative positioning of add-on unit 20 to starter 10.

Cover 27 is held in place by being positioned between spring clips 40a, 40b. Since the mounting of each of these clips 40a, 40b is identical and the mounting of each of these stationary contacts 24a, 24b is identical, only the mounting of clip 40b and stationary contact 24b will be described. As best seen in FIG. 1D stationary contact 24b is mounted on the upper upwardly offset surface at the left of elongated terminal number 44. Spring clip 40b is a generally L-shaped member whose vertical leg is bifurcated to receive cover protrusion 27b. The horizontal leg of clip 40b rests against the upper downwardly offset surface at the right of terminal 44. The bottom surface of terminal 44 is supported at both ends thereof by appropriately positioned surfaces of base 21. Inverted U-shaped wire grip 46 is positioned over the horizontal leg of clip 40b and clamping screw 47 passing through aligned clearance apertures in wire grip 46, spring clip 40b, and terminal 44, is threadably received by insert 48 in base 21 to operatively mount wire grip 4, spring clip 40b, and terminal number 44 to base 21.

Particular reference is now made to FIG. 3 for a description of the mechanism for operating the main movable contacts 13a, 13b, 13c of starter 10. Such mechanism includes generally U-shaped frame 101 secured to mounting plate 12 by rivets 103. Screws 105 secure insulating base 104 for U-shaped bimetal 154 to plate 12. Inverted U-shaped main actuator 106 is mounted between the upwardly extending legs of frame 101 and is pivoted thereto by rivets 107. Carrier actuator 108 is another U-shaped member having flanges 109 extending between the downward flanges 110 of main actuator 106 and being pivoted thereto through the cooperation of inward embossments 111 in flanges 110 which extend into notches in right-hand ends of flanges 109. The leftend of carrier actuator 108 engages web 112 of carrier guide bracket 113 which is secured to the lower side of contact carrier 30 by means of screws 170. Cradle 115 is a flat member with an L-shaped bearing extension for positioning and pivotally mounting cradle 115 between the flanges of mechanism frame 101 by utilizing shoulder rivet 116.

Auxiliary latch 117, for maintaining cradle 115 in the latched position of FIG. 3, is provided with web position 118 having downwardly extending legs 171 engaged by rivet 168 to pivotally mount auxiliary latch 117 between the flanges of mechanism frame 101. Auxiliary latch 117 is also provided with leg 119 extending upward from web 118 with the upper end 120 of leg 119 engaging main latch 121 to block clockwise rotation with respect to FIG. 3, of auxiliary latch 117 about its pivot 168.

Cradle 115 is provided with spring retainer 122, reset pin 123 below retainer 122, and latch tip or holding portion 124 at the right end for engaging the under-surface of latching web 118. Coiled tension springs 125, 125 on opposite sides of cradle 115 are connected between spring retainer 122 and holes 169 in carrier actuator 108.

With cradle 115 in the latched position of FIG. 3 main springs 125, 125 urge carrier actuator 108 in a counterclockwise direction about its pivot 111 causing carrier guide bracket 113 to be pressed down against mounting plate 12 with the lower end of bracket 113 being guided by post 126 extending upwardly from mounting plate 12. In this position of carrier guide bracket 113, each of the movable bridging contacts 13a, 13b, 13c engages its associated stationary contacts 51a, 52a; 51b, 52b (not shown); 51c, 52c (not shown) so that starter 10 is operated to its closed or start position.

With cradle 115 latched, main actuator 106 is urged in a clockwise direction about its pivot 107 since the line of action of main springs 125 and pivot 111 is below pivot 107. At this time main springs 125 tend to rotate cradle 115 in a counterclockwise direction about its pivot 116 but this movement is prevented by web 118 of auxiliary latch 117 which engages latch tip 124 of cradle 115.

Stop control 17 is connected through lever 17a to pivot 130 at the left portion of main actuator 106 while start control 16 is connected through lever 16a to pivot 132 at the right end of main actuator 106. Downward movement of start control 16 is limited through the engagement of its right-hand extension 135 with mechanism frame 101 at region designated 136.

Movable contact carrier 30 is provided with upwardly extending post 53a to guide spring retainer 54a and contact pressure spring 55a which provides contact pressure between bridging contact 13a and stationary contact 51a, 52a. The electrical circuit through the A phase or pole of starter 10 extends from line terminal 56a, through stationary contact 51a, bridging contact 13a, stationary contact 52a, terminal support 57a, conducting strap 58a, U-shaped heater 60a and load terminal 61a, to wire grip 62a.

Heater 60a is disposed between the legs of U-shaped bimetal 154 whose right leg at the upper end thereof is fixedly attached to the offset portion at the upper end of L-shaped support 63, which is connected by screw 64 to insulating block 104. When bimetal 154 is heated, the free end thereof engages trip bar lug 65 to pivot trip bar 66 in a counterclockwise direction about pivot 67 defined by aligned apertures in posts 68 at opposite end of trip bar 66. Screw 69 secures main latch 121 to trip bar 66.

When starter 10 is switched from its on or start position of FIG. 3 to its off or stop position of FIG. 4 by depressing stop button 17, main actuator 106 is rotated counterclockwise about its pivot 107 until actuator cam surface 142 engages reset pin 123 on cradle 115 as shown in FIG. 4. During this movement pivot 111 of carrier actuator 108 passes below the line of action of main spring 125 causing carrier actuator 108 to snap to the stop position of FIG. 4.

Latch bite for automatic tripping on overload is calibrated by screw 150 which engages the sloped surface on downward extension 149 of common trip bar 66. The head of calibrating screw 150 is accessible through a hole in mounting plate 12. Coiled compression spring 148 urges plunger 148a to the left with respect to insulating block 104 into engagement with tripper bar extension 149 to bias tripper bar 66 in a clockwise direction into latching position. The automatic trip characteristic for each phase of starter 10 is adjusted by bending bracket 63 to vary the space between the free leg of bimetal 154 for the respective phase and lug 65 on common tripper bar 66.

When deflection of bimetal 154 causes sufficient counterclockwise rotation of tripper bar 66, main latch 121 pivots downward below lateral extension 120 of auxiliary latch 117. At this time the forces exerted by main spring 125 on cradle 115 are directed upward and are transmitted through cradle end 124 to cause clockwise rotation of auxiliary latch 117 about its pivot 168 to assume the position shown in FIG. 5. In this position cradle end 124 clears auxiliary latch web 118 and cradle 115 is rotated counterclockwise about its pivot 116 under the influence of main spring 125 until the upper edge 160 of cradle 115 engages bearing pin 107. During this counterclockwise rotation of cradle 115 the line of action of main springs 125 passes above pivot 111 causing carrier actuator 108 to snap to the trip position of FIG. 5. Main actuator 106 has also rotated counterclockwise until its cam surface 142 comes to rest against reset pin 123 on cradle 115. This intermediate position of main actuator 106 gives the start and stop buttons 16, 17 a corresponding intermediate or trip position for visual indication of automatic tripping.

It should now be apparent that the mechanism is trip free since movements of the various operating mechanism elements as a result of an overload condition are not impeded even if start button 16 is held depressed by the operator.

Auxiliary latch 117 is held in its trip position of FIG. 5 by torsion spring 161. To reset the operating mechanism to the stop position of FIG. 4, stop button 17 is depressed resulting in counterclockwise movement of main actuator 106 causing cam surface 142 thereof to bear against cradle reset pin 123. This results in a clockwise pivoting of cradle 115 about its pivot 116 with the lower edge 172 of cradle 115 engaging lug 162 of auxiliary latch 117 rotating the latter counterclockwise to the latch position shown in FIG. 4.

In order to prevent unlatching of main latch 121 from auxiliary latch 117 when starter 10 is open as a result of shock during switching from start to stop or as a result of other mechanical shock, starter 10 is provided with torsion spring 163 (FIG. 6) wound around and retained under the head of main actuator pivot 107. End 164 of spring 163 engages the head of lever bearing 130 from below and the other end 165 of spring 163 bears upward against shelf 166 of common trip bar 66. In the start position of starter 10 lever bearing 130 is in the raised position and the pressure of spring end 165 against latch rod shelf 166 is relieved so that rotational movement of common trip bar 66 under these conditions is not restrictive. However, when main actuator 106 is moved to the stop position, pressure exerted by spring end 165 increases due to the downward movement of bearing 130 against spring end 165. This increased pressure exerted by spring 163 urges common trip bar 66 to latching position to prevent clockwise rotation of common trip bar 66 with respect to FIG. 6 to prevent unlatching due to mechanical shock whether created by the contact operating mechanism or otherwise.

To further overcome the effect of external mechanical shock on starter 10 three removable combination shock mounting and captive mounting screw assemblies are employed. One of these assemblies is shown in detail in FIG. 2A. More particularly, assembly 70 includes tube-like member 71 having internally threaded nut portion 72 at it upper end. The bore of member 71 below the threaded portion thereof is of a diameter slightly larger than the outer diameter of threads 73 at the end of screw 74 remote from head 75 thereof. The threads of screw 74 are complementary to the threads of nut portion 72, while the shank portion 76 of screw 74 is of smaller diameter than the threads of nut 72.

The lower end of member 71 is provided with outwardly turned lip 77 which retains rubber-like grommmet 78 mounted to member 71 in the space between lip 77 and nut 72. It should now be apparent that screw 74, after being threaded through nut portion 72 is captive to member 71 but is rotationally free so that it may be securely threaded into mounting wall 79 for securement of starter 10.

Starter mounting plate 12 is provided with two extensions 88, at its right end as viewed in FIG. 1A, each having a slot 89 to receive an assembly 70 with portions of extension 88 being disposed within the annular groove in the outersurface of grommet 78. The reduced width of slot 89 at 90 prevents assembly 70 from accidentally falling out, but permits it to be pressed in or pulled out as desired.

As clearly seen in FIG. 2A, there is no metal to metal connection between mounting plate 12 of starter 10 and the mounting wall 79 of the starter enclosure so that any shock from wall 89 cannot be transmitted directly to starter 10. The abutment of lip 77 against wall 79 prevents excessive pressure from screw 74 to crushing or deforming grommet 78. Extension 91 at the left end of mounting plate 12 in FIG. 1A has three similar slots 92, so that a grommet assembly 70 may be installed in any one of the slots 92 to suit a plurality of locations that may be desired on mounting wall 79. The view of assembly 70 in FIG. 3 shows screw 74 retracted, but captive, preparatory to threading into mounting wall 79.

Internal lock 93, seen best in FIGS. 1A and 3, is provided so that starter 10 cannot be accidentally switched on when work is being done on the unit with its enclosure cover removed. Lock 93 is pivoted to the forward surface of case 11 on screw 94 which extends through case 11 and is threaded into mounting plate 12 to obtain a grounded connection. Spring 95 under the head of screw 94 holds lock 93 in a downward position against case 11 so that dimple 96 provides registration with grooves in the surface of case 11 to hold lock 93 selectively in its locked or unlocked position. When starter 10 is in stop position and when internal lock 93 is rotated counterclockwise as seen in FIG. 1A, end portion 97 thereof enters notch 98 in start lever 16a preventing start button 16 from being depressed.

FIG. 9 shows an enclosure 200 wherein starter 10 is mounted to the rear wall 201 thereof by shock mountings 70. Enclosure cover 205 is provided with plastic bezel 206 having rectangular openings for guidance of and accessibility to start button 16 and stop button 17. The rear portion of bezel 206 extends to the rear of cover 205 and is connected by screws 207 to the web portion of generally U-shaped spring retainer which bears against the internal surface of cover 205, to maintain bezel 206 in operative position. Bezel 206 is also provided with rearward extension 208 for slidably guiding the rectangular shaped left-hand end 209 of lock bar 210 so that the latter may be moved to the right or left, but may not be rotated. Bar 210 is urged to the right by spring 211 which bears against collar 212 fixed on rod 210, and insulating tube 213 which extends from bezel projection 208 to the right with respect to FIG. 9.

In a manner well known to the art, a formation (not shown but similar to pin 331 at the left in FIG. 12) at the left end of cover 205 engages a cooperating formation (not shown) of enclosure 200 when the right end of cover 205 is in the closed position shown in FIG. 9 to hold that left end of cover 205 closed. The right end of cover 205 is provided with L-shaped tab 214 which carries clip 216 which in turn holds closing screw 215. The latter is engageable with a threaded aperture through enclosure tab 217. Tab 217 is also provided with upward extension 217a having a padlock receiving aperture 217b. When locking bar 210 is moved to the left to the position shown in FIG. 9 the flattened offset right end 210a thereof moves to the left of aperture 217b and lock shackle 218 extending through aperture 217b blocks rightward movement of bar 210. In the position of locking bar 210 shown in FIG. 9 left-end 209 thereof extends into elongated recess 17b of stop button 17 to block upward movement thereof. Thus, start button 16 cannot be depressed to operate starter 10 to a closed position.

FIGS. 10, 11 and 12 show external lock off and a cover to make enclosure 200 dust-tight. To obtain a dust-tight construction around the stop and start buttons, flexible diaphragm 312 is clamped between bezel 313 and top surface 314 of enclosure cover 315 by the screws 316. Diaphragm 312 extends over start button 16 and stop button 17 of starter 10 as shown in FIG. 11 where control buttons 16, 17 are in the start position. Auxiliary stop button 317 and the auxiliary start button 318 extend through openings in the top surface of the bezel 313 and have cylindrical extensions 319 and 320, respectively, which extend through holes 321 in walls 322 of the bezel 313. Extensions 319, 320 fit into return springs 323 retained by the washers 324 and the drive rivets 325. These rivets engage the outside surface of diaphragm 312 as shown in FIG. 12. These return springs 323 urge auxiliary buttons 317, 318 inward with just enough force to follow the buttons of starter 10 but not with enough force to impede operation of buttons 16, 17. It is thus apparent that auxiliary buttons 317, 318 by their positions relative to bezel 313 will give a true indication of starter 10 whether it be the start, stop or reset conditions in a dust-tight manner.

External lock off 306 for enclosure 200 is the same as the general purpose type of FIG. 9 except that its right hand end extends through grommet 326 and its left hand end is supported and guided by bracket 327 which is retained by screws 316. To complete the dust-tight enclosure, the gasket 328 is cemented in cover groove formed by inward offset 329 and positioned to engage the entire forward edge of enclosure 200.

FIGS. 13, 13A and 14 show elements providing a so-called jogging feature. These elements include plastic housing 329 mounted to the upper surface of cover 400. Housing 329 includes threaded portion 330 for attachment nut 331. Rotatable knob 332, journaled to a bore in housing 329, has a square portion 333 keying flexible metal finger 334 so that it rotates in unison with knob 332. Spacer 335 with screw 336 secures spring finger 334 to square portion 333 of the knob 332. Left hand end 337 of finger 334 in the jog position extends under the start button 16 as shown in FIGS. 13 and 14. In FIG. 13 start button 16 is in the stop or outward position. When this button 16 is depressed, as in switching to start, the starter 10 will remain in the start position only so long as the operator holds button 16 in. As soon as he releases button 16, spring 334 forces start button 16 upward into the stop position. These operations will be with the normal quick make and break of starter 10. FIG. 13A shows how the right end 338 of the spring 334 rests in pocket 339 of angular member 340. When knob 332 is rotated counterclockwise into the run position as viewed in FIG. 14, end of 337 of spring 334 moves out from under button 16 into an ineffective position at the same time end 338 moves into pocket 341 and will be registered or retained there in the normal run position.

Although the invention has been described above with respect to its preferred embodiments, it will be understood that many variations and modifications will be obvious to those skilled in the art. It is preferred therefor that the scope of the invention be limited not by the specific disclosure herein but only by the appended claims.

The embodiments of the invention in which an exclusive privilege or property is claimed are defined as follows:

1. A circuit controller comprising cooperating contact means; an operating mechanism for opening and closing said contact means by operating a movable element of said contact means between normal and actuated positions, and an enclosure wherein said contact means and said mechanism are disposed; said operating mechanism comprising an overcenter toggle, main spring means connected to said toggle for snap acting operation thereof, a cradle connected to said toggle, latch means for maintaining said cradle latched, and fault responsive trip means for automatically releasing said latch means upon the occurrence of predetermined fault conditions; said mechanism including a main actuator operable between a first and a second position by means external of said enclosure; said cradle when latched permitting said mechanism to operate said movable element to said actuated position when said main actuator is operated to said second position; said cradle when unlatched preventing said movable element from being operated to said actuated position regardless of the position of said main actuator; biasing means exerting a force urging said latch means to latching position; said mechanism also including pivot means to which said main actuator is pivotally mounted; first and second controls connected to said main actuator on opposite sides of said pivot means and extending outside of said enclosure; means positioning said controls side by side outside of said enclosure and guiding said controls for movement in opposite directions; said first control when depressed pivoting said main actuator to said first position; said second control when depressed pivoting said main actuator to said second position; an outer enclosure wherein said enclosure is mounted; depressible first and second outer controls mounted to said outer enclosure and engageable with said first and second controls, respectively, whereby depressing said outer first control depresses said first control and depressing said outer second control depresses said second control; selector means mounted to said outer enclosure for operation external thereof between an active and an inactive position; said selector means including biasing means which, when said selector means is in said active position, operates said main actuator to said first position when said outer second control is released, said biasing means being disengaged from said controls when said selector means is in said inactive position.

2. A circuit controller as set forth in claim 1 in which said biasing means is a leaf spring; a pivotal connection mounting said spring to said outer enclosure.

3. A circuit controller as set forth in claim 2 in which the pivotal connection is at one end of said leaf spring and the other end of said leaf spring is operatively engageable with said second control when said selector means is in said active position.

4. A circuit controller comprising cooperating contact means; an operating mechanism for opening and closing said contact means by operating a movable element of said contact means between normal and actuated positions, and an enclosure wherein said contact means and said mechanism are disposed; said operating mechanism comprising an overcenter toggle, main spring means connected to said toggle for snap acting operation thereof, a cradle connected to said toggle, latch means for maintaining said cradle latched, and fault responsive trip means for automatically releasing said latch means upon the occurrence of predetermined fault conditions; said mechanism including a main actuator operable between a first and second position by means external of said enclosure; said cradle when latched permitting said mechanism to operate said movable element to said actuated position when said actuator is operated to said second position; said cradle when unlatched preventing said movable element from being operated to said actuated position regardless of the position of said main actuator; biasing means exerting a force urging said latch means to latching position; first and second depressible controls connected to said main actuator for operating the latter to its respective said first and said second positions; an outer enclosure wherein said enclosure is mounted; said outer enclosure comprising a case and an openable cover having aperture means aligned with said controls when said cover is closed; gasket means for sealing boundary portions between said case and said cover; first and second auxiliary depressible controls mounted to said cover in alignment and operatively engageable with said first and second controls respectively when said cover is closed; diaphragm means mounted to said cover in position over said aperture means, and auxiliary biasing means of substantially less force than said main spring means urging said auxiliary controls to depressed positions engaging said diaphragm means.

5. A circuit controller as set forth in claim 4 in which said auxiliary biasing means is positioned on the exterior side of said diaphragm means.

6. A circuit controller as set forth in claim 5, in which said auxiliary controls are disposed entirely on the exterior side of said diaphragm means.

7. A circuit controller as set forth in claim 6, in which there is a non-porous covering closing said aperture means, said covering formed solely by said diaphragm means.

References Cited

UNITED STATES PATENTS

| 2,473,901 | 6/1949 | Pierce | 337—74 |
| 1,987,571 | 1/1935 | Hardage. | |
| 1,903,135 | 3/1933 | Rees. | |

BERNARD A. GILHEANY, Primary Examiner

D. M. MORGAN, Assistant Examiner

U.S. Cl. X.R.

200—168, 172; 337—53